(12) United States Patent
Kuroki

(10) Patent No.: US 8,154,548 B2
(45) Date of Patent: Apr. 10, 2012

(54) INFORMATION PROCESSING APPARATUS AND INFORMATION PROCESSING METHOD

(75) Inventor: Tsuyoshi Kuroki, Cambridge, MA (US)

(73) Assignee: Canon Kabushiki Kaisha, Tokyo (JP)

( * ) Notice: Subject to any disclaimer, the term of this patent is extended or adjusted under 35 U.S.C. 154(b) by 562 days.

(21) Appl. No.: 11/526,613

(22) Filed: Sep. 26, 2006

(65) Prior Publication Data

US 2007/0182761 A1    Aug. 9, 2007

(30) Foreign Application Priority Data

Oct. 3, 2005 (JP) ................................ 2005-290373
Jul. 28, 2006 (JP) ................................ 2006-207176

(51) Int. Cl.
*G06T 11/20* (2006.01)
*G09G 5/00* (2006.01)

(52) U.S. Cl. ...................... 345/440; 345/632; 345/633

(58) Field of Classification Search .............. 345/632, 345/440.1, 633, 474, 440
See application file for complete search history.

(56) References Cited

U.S. PATENT DOCUMENTS

| | | | | |
|---|---|---|---|---|
| 5,717,848 A | * | 2/1998 | Watanabe et al. | 345/474 |
| 6,031,545 A | * | 2/2000 | Ellenby et al. | 345/632 |
| 6,842,175 B1 | * | 1/2005 | Schmalstieg et al. | 345/427 |
| 6,970,169 B1 | * | 11/2005 | Harris | 345/440 |
| 7,003,400 B2 | * | 2/2006 | Bryant | 702/5 |
| 7,123,214 B2 | | 10/2006 | Kuroki et al. | 345/8 |
| 2002/0103617 A1 | * | 8/2002 | Uchiyama et al. | 702/150 |
| 2003/0014212 A1 | * | 1/2003 | Ralston et al. | 702/150 |

FOREIGN PATENT DOCUMENTS

| | | |
|---|---|---|
| JP | 2000-148970 A | 5/2000 |
| JP | 2000-155855 | 6/2000 |
| JP | 2000-353253 A | 12/2000 |
| JP | 2003-44848 A | 2/2003 |
| JP | 2004-160700 | 6/2004 |
| JP | 2005-49996 A | 2/2005 |

OTHER PUBLICATIONS

Yamamoto, et al., A New Framework for Constructing Distributed Virtual Environment for Communication and Thinking Media, IPSJ Journal, Information Processing Society of Japan, vol. 43, No. 9, pp. 2914-2927, Sep. 2002 (English abstract included).

* cited by examiner

*Primary Examiner* — Aaron M Richer
*Assistant Examiner* — Robert Craddock
(74) *Attorney, Agent, or Firm* — Fitzpatrick, Cella, Harper & Scinto

(57) ABSTRACT

A measured value of a physical quantity measured using a measuring device within a predetermined region on a real space, and a position where the measuring device performs measurement are acquired (S1001 to S1003). An analytic value of the physical quantity at that position in the predetermined region is calculated (S1004). A first object representing the measured value and a second object representing the analytic value are arranged at a place corresponding to this position on a virtual space having a coordinate system which matches the coordinate system of the real space (S1005, S1006). An image which is seen upon viewing the virtual space on which the first and second objects are arranged from a viewpoint is generated, and the generated image is output (S1008, S1009).

6 Claims, 18 Drawing Sheets

F I G. 1
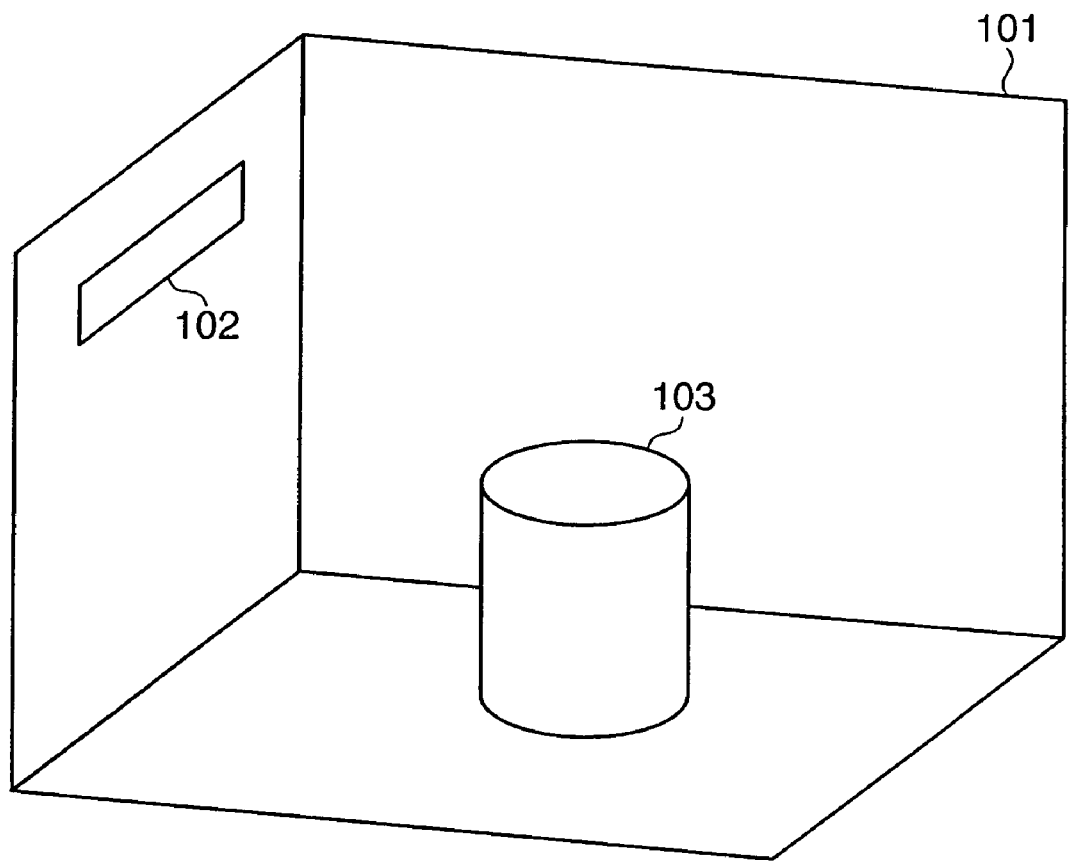

INFORMATION PROCESSING APPARATUS AND INFORMATION PROCESSING METHOD

BACKGROUND OF THE INVENTION

1. Field of the Invention

The present invention relates to a technique for presenting analytic values as results of analysis calculation of physical quantities such as a temperature, wind direction, and the like, and actual measured values of such quantities to the user.

2. Description of the Related Art

In recent years, computer technologies support the product design and manufacture, and the pre-examination of process design. Such technologies allow to examine respective components of products without manufacturing actual products by making analyses such as impact analysis, vibration analysis, fluid analysis, stress analysis, and the like using data of products created on computers.

In order to make analyses using product data, it is a common practice to convert the product data into analysis data by a system called a pre-processor. For example, a process called meshing is known. This process replaces a mathematically defined continuous plane by a set of small triangles or rectangles. In general, as the meshing gets finer, the analysis result becomes more accurate. However, the analytic calculations require much time accordingly.

A calculation system called a solver analyzes the analysis data of the product prepared by the pre-processor using a calculation model that expresses the laws of physics on a real world by a mathematical method such as a finite element method, after analysis conditions such as initial values and the like are set. A visualization system called a post-processor expresses the analysis result in a format that the user can visually understand. As the expression method, the colors indicating temperature distribution obtained by the analytic calculations are assigned to the sectional view of the product.

Furthermore, in recent years, along with the progress of computer graphics technologies such as volume graphics and the like, the analysis results are expressed three-dimensionally. Also, the virtual reality (VR) technique allows the user who wears a head-mounted display (HMD) on the head to view the three-dimensionally expressed analysis result from a free viewpoint. In this case, when the user moves the head, computer graphics data to be displayed changes in accordance with that motion (see Japanese Patent Laid-Open No. 2000-155855).

Also, the augmented reality (AR) technique allows the user who wears the HMD on the head to view the three-dimensionally expressed analysis result combined with a real space from a free viewpoint. Since the AR technique allows the user to simultaneously observe the real world in addition to computer graphics unlike the VR technique, the user can point to the analysis result by his or her own finger.

The analysis result does not always match an actual result. In such a case, the calculation model used in analysis may not match the real world, or meshing done by the pre-processor may be inappropriate. For this reason, whether or not the analysis result matches the actual result must be verified. Conventionally, the following verification method is adopted.

1. A product is produced in practice, the same actual environment as the analysis conditions upon making analyses is prepared, and actual values are measured at some points.

2. Analytic values corresponding to the points where the actual measured values are obtained are acquired.

3. By repeating processes 1 and 2, a graph is created.

With this method, the actual measured values and analytic values can be compared. Such a comparison method is disclosed in, e.g., Japanese Patent Laid-Open No. 2004-160700.

However, since the method disclosed in Japanese Patent Laid-Open No. 2004-160700 makes comparison by means of a graph, the user cannot intuitively recognize the points and degrees of differences between the actual measured values and analytic values on the space.

The present invention has been made in consideration of the aforementioned problems, and has as its object to provide a technique that allows the user to intuitively recognize the differences between the actual measured values and analytic values of physical quantities on the real space.

SUMMARY OF THE INVENTION

In order to achieve an object of the present invention, for example, an information processing apparatus of the present invention comprises the following arrangement.

That is, an information processing apparatus comprising:

first acquisition unit adapted to acquire a measured value of a physical quantity measured using a measuring device in a predetermined region on a real space;

second acquisition unit adapted to acquire a position where the measuring device performs the measurement;

calculation unit adapted to calculate an analytic value of the physical quantity at the position in the predetermined region by executing calculation processing using data prepared in advance for the predetermined region;

arrangement unit adapted to arrange a first object representing the measured value acquired by the first acquisition unit at a place corresponding to the position on a virtual space which has a coordinate system that matches a coordinate system of the real space, and to arrange a second object representing the analytic value calculated by the calculation unit at the place;

generation unit adapted to generate an image which is seen upon viewing the virtual space on which the first and second objects are arranged from a viewpoint; and output unit adapted to output the image generated by the generation unit.

In order to achieve an object of the present invention, for example, an information processing method of the present invention comprises the following arrangement.

That is, an information processing method comprising:

a first acquisition step of acquiring a measured value of a physical quantity measured using a measuring device in a predetermined region on a real space;

a second acquisition step of acquiring a position where the measuring device performs the measurement;

a calculation step of calculating an analytic value of the physical quantity at the position in the predetermined region by executing calculation processing using data prepared in advance for the predetermined region;

an arrangement step of arranging a first object representing the measured value acquired in the first acquisition step at a place corresponding to the position on a virtual space which has a coordinate system that matches a coordinate system of the real space, and arranging a second object representing the analytic value calculated in the calculation step at the place;

a generation step of generating an image which is seen upon viewing the virtual space on which the first and second objects are arranged from a viewpoint; and an output step of outputting the image generated in the generation step.

Further features of the present invention will become apparent from the following description of exemplary embodiments with reference to the attached drawings.

BRIEF DESCRIPTION OF THE DRAWINGS

FIG. 1 shows the interior of an apparatus as a space to be analyzed;

DESCRIPTION OF THE EMBODIMENTS

Preferred embodiments of the present invention will be described in detail hereinafter with reference to the accompanying drawings.

[First Embodiment]

Figure 8:
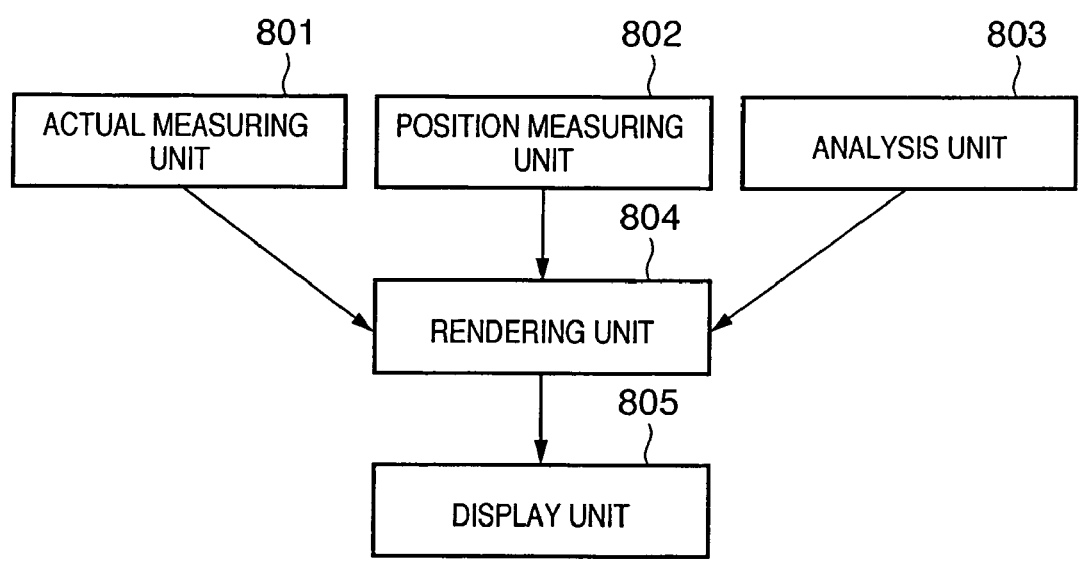
FIG. 8 is a block diagram showing the functional arrangement of a system according to the first embodiment of the present invention.

FIG. 8 is a block diagram showing the functional arrangement of a system according to this embodiment. As shown in FIG. 8, the system according to this embodiment comprises an actual measuring unit 801, position measuring unit 802, analysis unit 803, rendering unit 804, and display unit 805.

The actual measuring unit 801 measures physical quantities at its position on the real space to obtain measurement results (actual measured values). Note that the actual measuring unit 801 adopts an appropriate one according to an object to be measured. The position measuring unit 802 measures the position of the actual measuring unit 801, i.e., the position where the actual measured values are measured. The analysis unit 803 executes analysis processing to be described later. The rendering unit 804 arranges a CG object that represents the physical quantities measured by the actual measuring unit 801 at the position of the actual measuring unit 801 measured by the position measuring unit 802 on a virtual space whose coordinate system matches that of the real space. Furthermore, the rendering unit 804 arranges a CG object that represents analysis results of the analysis unit 803 at that position on the virtual space. Then, the rendering unit 804 generates an image to be seen when the user observes the images on the virtual space on which these CG objects are arranged from a predetermined viewpoint.

The display unit 805 displays the image generated by the rendering unit 804.

This embodiment will explain a case wherein the flow of air in a given apparatus is measured to obtain actual measured values, a computer simulation of the flow of air is made to obtain analytic values, and the actual measured values and analytic values are presented to the user as images using the aforementioned system.

FIG. 1 shows the interior of an apparatus as a space to be analyzed. As shown in FIG. 1, an apparatus 101 has an air outlet 102, and includes a component 103. The flow of air blown from the air outlet 102 is influenced by the internal shape of the apparatus 101 and the existence of the component 103. Hence, this embodiment will explain a case wherein the actual measured values and analytic values of the flow of air (airflow) in the apparatus 101 shown in FIG. 1 are visualized as images and the images are presented to the user using the system having the functional arrangement shown in FIG. 8.

Figure 9:
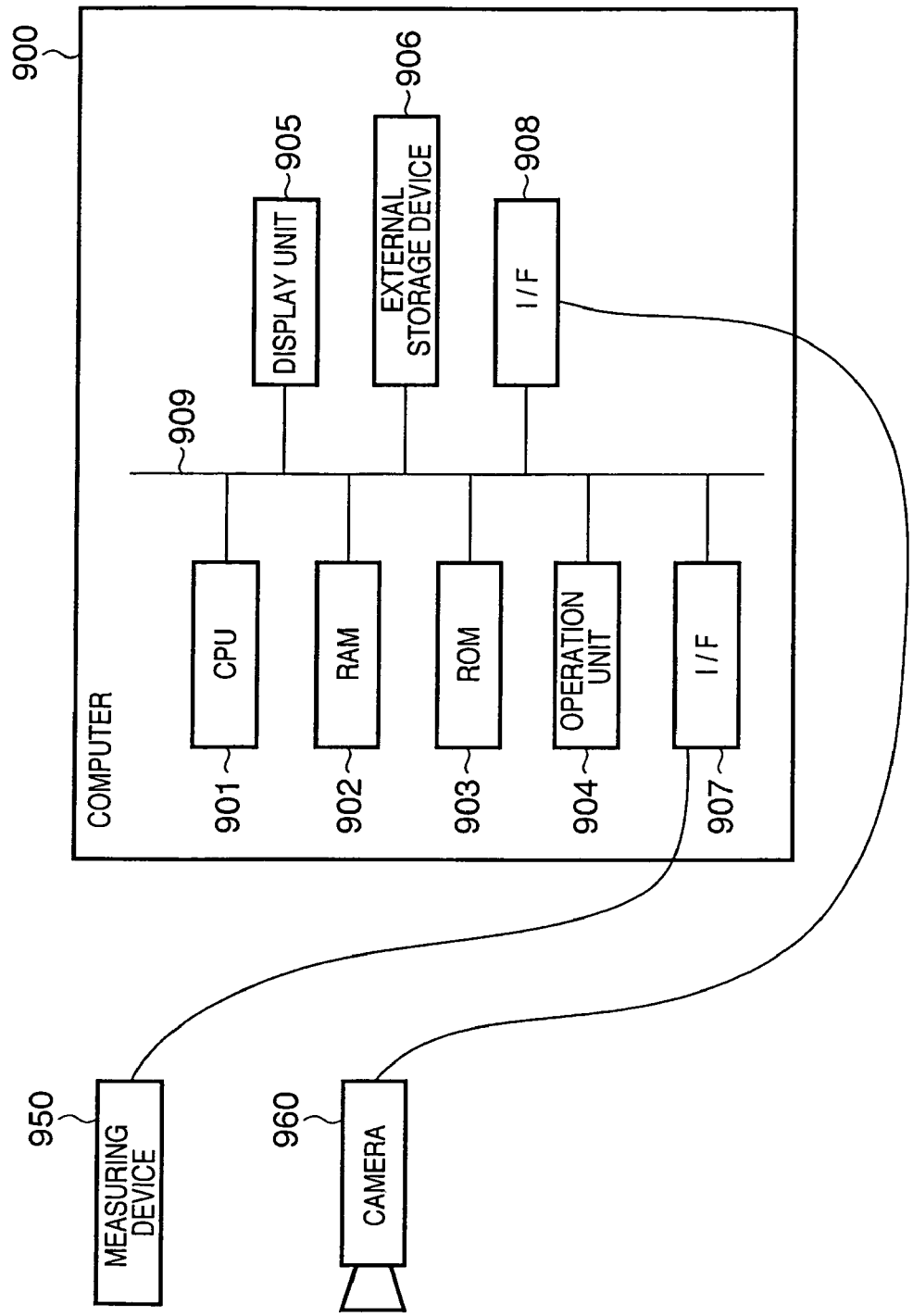
FIG. 9 is a block diagram showing the hardware arrangement of the system according to the first embodiment of the present invention when the system having the functional arrangement shown in FIG. 8 is implemented by hardware.

FIG. 9 is a block diagram showing the hardware arrangement of the system according to this embodiment with the functional arrangement shown in FIG. 8 upon hardware implementation of that system.

As shown in FIG. 9, the system according to this embodiment comprises a measuring device 950, camera 960, and computer 900. The measuring device 950 will be explained first.

Figure 3:
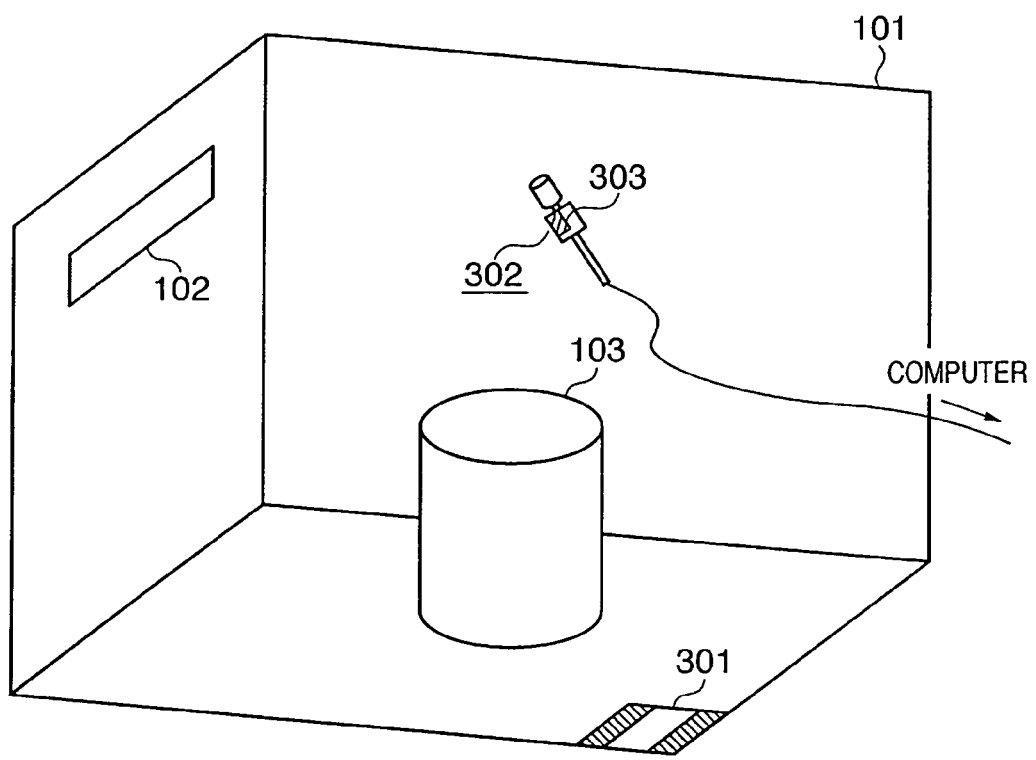
FIG. 3 shows a wind direction measuring device 302 that measures an airflow in an apparatus 101.

The measuring device 950 corresponds to the aforementioned actual measuring unit 801, which is used to obtain actual measured values of the airflow in the apparatus 101 in this embodiment. Therefore, the measuring device 950 is a wind direction measuring device with the arrangement shown in FIG. 3. FIG. 3 shows a wind direction measuring device 302 which measures the airflow in the apparatus 101. The wind direction measuring device 302 is a handheld type, and the measured values of the wind direction measuring device 302 are output to the computer 900.

The wind direction measuring-device 302 is attached with a marker 303 used to measure the self position. Furthermore, a marker 301 is attached inside the apparatus 101 for the same purpose.

The camera 960 will be described below. The camera 960 is used to capture a moving image of the real space including the apparatus 101. The captured frame images are output to the computer 900. The camera 960 captures images of the markers 301 and 303, and outputs the captured images to the computer 900. The computer 900 can calculate the position of the wind direction measuring device 302 by a known technique using these images.

The computer 900 will be described below. The computer 900 comprises, e.g., a general PC (personal computer), WS (workstation), or the like, and is connected to the measuring device 950 and camera 960.

Reference numeral 901 denotes a CPU which controls the overall computer 900 using programs and data stored in a RAM 902 and ROM 903, and executes respective processes to be described later implemented by the computer 900.

Reference numeral 902 denotes a RAM which has an area for temporarily storing programs and data loaded from an external storage device 906, an area for temporarily storing information input from the measuring device 950 and camera 960 via interfaces 907 and 908, and the like. Furthermore, the RAM 902 has a work area used when the CPU 901 executes respective processes to be described later.

Reference numeral 903 denotes a ROM which stores setting data and a boot program of the computer 900.

Reference numeral 904 denotes an operation unit which comprises a keyboard, mouse, and the like. When the operator of the computer 900 operates the operation unit 904, he or she can input various instructions to the CPU 901.

Reference numeral 905 denotes a display unit which comprises a CRT, liquid crystal display, or the like, and can display the processing result of the CPU 901 by means of images, text, and the like.

Reference numeral 906 denotes an external storage device which is a large-capacity information storage device represented by a hard disk, and saves an OS (operating system), programs and data for making the CPU 901 execute respective processes (to be described later) implemented by the computer 900, and the like. These programs and data are loaded as needed onto the RAM 902 under the control of the CPU 901, and are to be processed by the CPU 901.

Reference numeral 907 denotes an I/F (interface) which is used to connect this computer 900 to the measuring device 950. The measurement result of the measuring device 950 is input to the RAM 902 and external storage device 906 in the computer 900 via this I/F 907.

Reference numeral 908 denotes an I/F (interface) which is used to connect this computer 900 to the camera 960. Respective frame images captured by the camera 960 are input to the RAM 902 and external storage device 906 in the computer 900 via this I/F 908.

Reference numeral 909 denotes a bus which interconnects the aforementioned units.

Figure 10:
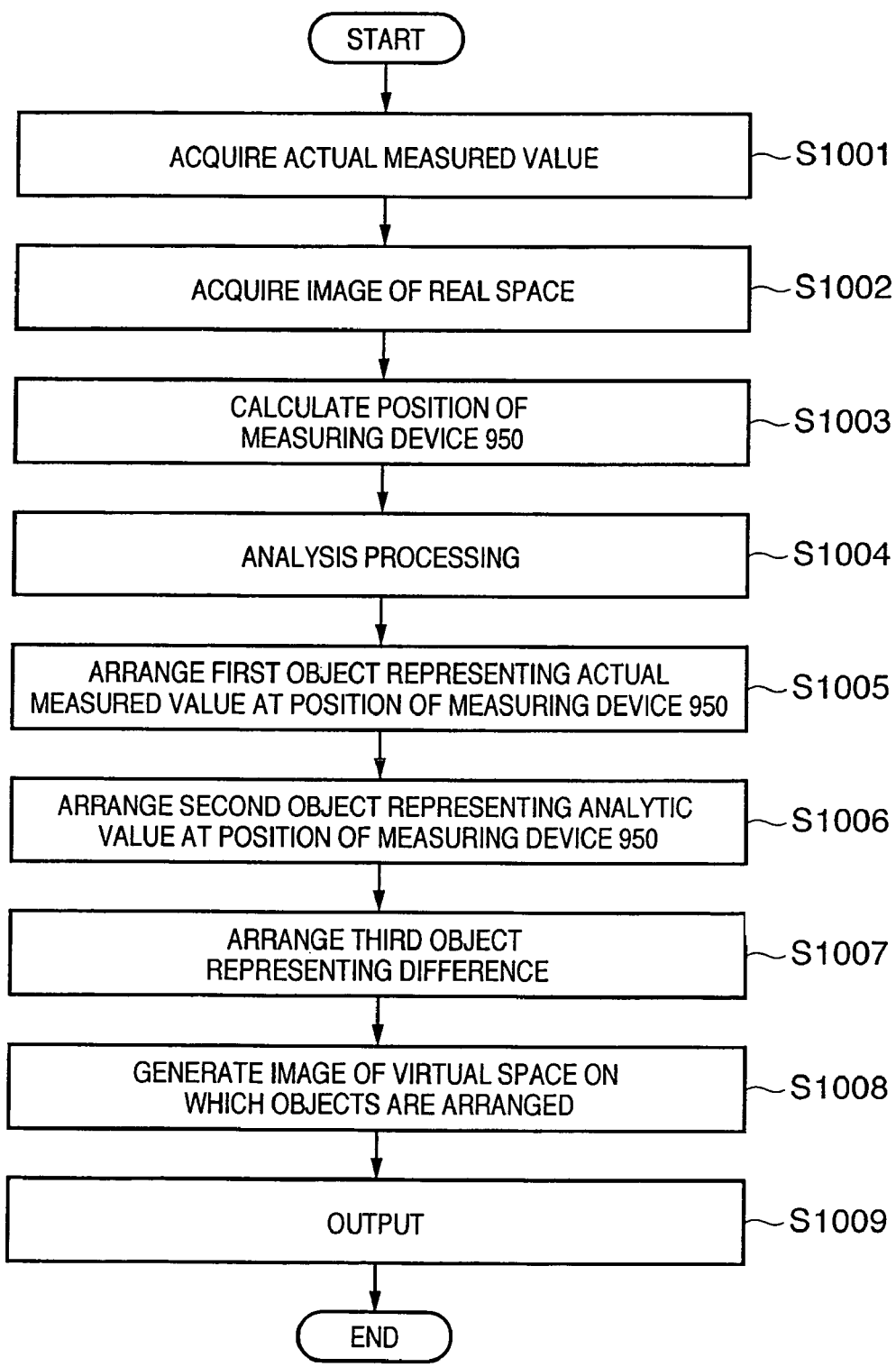
FIG. 10 is a flowchart of processing to be executed by a computer 900 when the computer 900 visualizes the actual measured values and analytic values of the flow of air (airflow) in the apparatus 101 shown in FIG. 1 and presents them to the user.

The processing to be executed by the computer 900 upon visualizing the actual measured values and analytic values of the flow of air (airflow) in the apparatus 101 shown in FIG. 1 and presenting them as images to the user will be described below using FIG. 10 which shows the flowchart of this processing. Note that a program and data for making the CPU 901 execute the processing according to the flowchart shown in FIG. 10 are saved in the external storage device 906. The program and data are loaded onto the RAM 902 as needed under the control of the CPU 901. When the CPU 901 executes the processing using the loaded program and data, the computer 900 implements respective processes to be described later.

The measuring device 950 is located inside the apparatus 101, and measures physical quantities (the wind direction and air volume in this case) at its own position. The measuring device 950 outputs the measured result to the computer 900 as a measured value (actual measured value). Therefore, upon detection of the input measured value via the I/F 907, the computer 901 acquires that value in the RAM 902 or external storage device 906 (step S1001).

On the other hand, the camera 960 captures an image of the physical space including the markers 301 and 303, and outputs respective frame images to the computer 900, as described above. Therefore, upon detection of input frame images via the I/F 908, the computer 900 acquires them in the RAM 902 or external storage device 906 (step S1002).

The CPU 901 executes processing for calculating the position of the measuring device 950 using the images captured in step S1002 (step S1003). The processing for calculating the position of the measuring device 950 will be described below.

The markers 301 and 303 are respectively attached to the known position on the measuring device 950, and that in the apparatus 101, as shown in FIG. 3. The shapes, sizes, patterns, and attached positions of the respective markers 301 and 303 are registered in advance in the external storage device 906 in the computer 900 as marker data.

Therefore, when the CPU 901 acquires the image including the markers 301 and 303 from the camera 960, it can calculate the position of the marker 303 (the position of the wind direction measuring device 302) in the apparatus 101 by a known technique using this image and the marker data.

With the above description, according to the processes in steps S1001 to S1003, a set of the position of the measuring device 950 in the apparatus 101 and the measured value of this measuring device 950 can be acquired.

Note that various methods of calculating the position of the measuring device 950 in the apparatus 101 are available, and the present invention is not limited to the aforementioned method. For example, measuring devices 950 may be arranged at a plurality of positions (known positions) in the apparatus 101, and may output their measured values and own identifiers to the computer 900. In this case, since the computer 900 receives a set of the identifier and measured value from each individual measuring device 950, it can recognize the measuring device 950 and its measured value with reference to the received set. Also, the measured value and measurement position may be simultaneously obtained using the measuring device 950 by means of a laser beam.

Therefore, independently of the method used, the measuring device 950 measures physical quantities at a plurality of positions in the apparatus 101. The computer 900 acquires the measured values at respective positions, and also their measurement positions.

The computer 900 makes distribution calculations of the wind direction and air volume in the apparatus 101 by known computer simulations using initial value data prepared in advance for the airflow in the apparatus 101 and calculation model formulas for hydrodynamics calculations (step S1004). That is, a virtual space having a coordinate system which matches that (apparatus coordinate system) defined in the apparatus 101 is defined, and the distribution calculations of the wind direction and air volume are made by the computer simulations on that virtual space. In this way, the analytic values of the wind direction and air volume at respective positions on the virtual space can be calculated.

The computer 900 arranges first objects indicating the measured values of the wind direction and air volume acquired in step S1001 at the positions on the virtual space corresponding to those calculated in step S1003 (step S1005). Note that the corresponding positions on the virtual space and in the apparatus 101 have the same coordinate value since the coordinate system on the virtual space matches the apparatus coordinate system.

Figure 2:
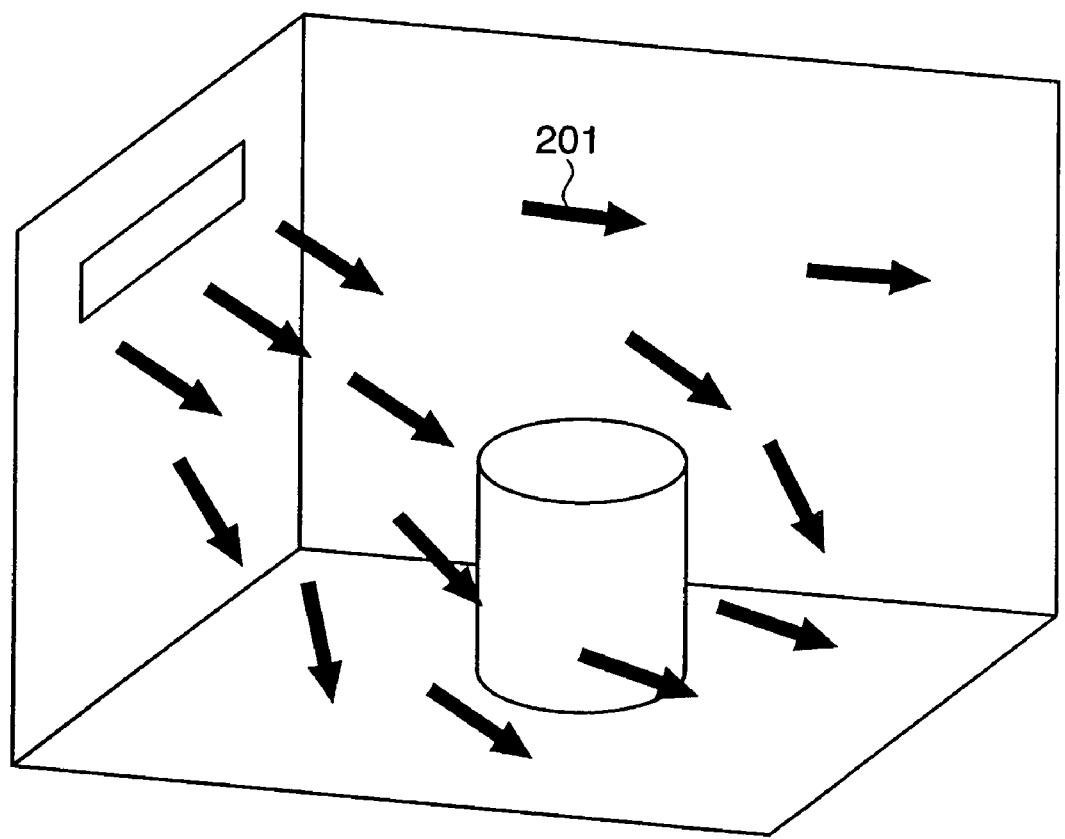
FIG. 2 shows an example of a virtual space on which first objects are arranged in step S1005.

FIG. 2 shows an example of the virtual space on which the first objects are arranged in step S1005. FIG. 2 illustrates the interior of the apparatus 101 on the background for the sake of convenience. Referring to FIG. 2, reference numeral 201 denotes first objects, each of which represents the wind direction by the direction of an arrow, and the air volume by the length of the arrow. Each arrow represents the measured values of the wind direction and air volume at the corresponding measurement positions obtained in step S1003. The expression form of the first object is not limited to that shown in FIG. 2. For example, general expression forms used to express a vector field such as flow line indication, particle trace, and the like may be used.

Figure 4:
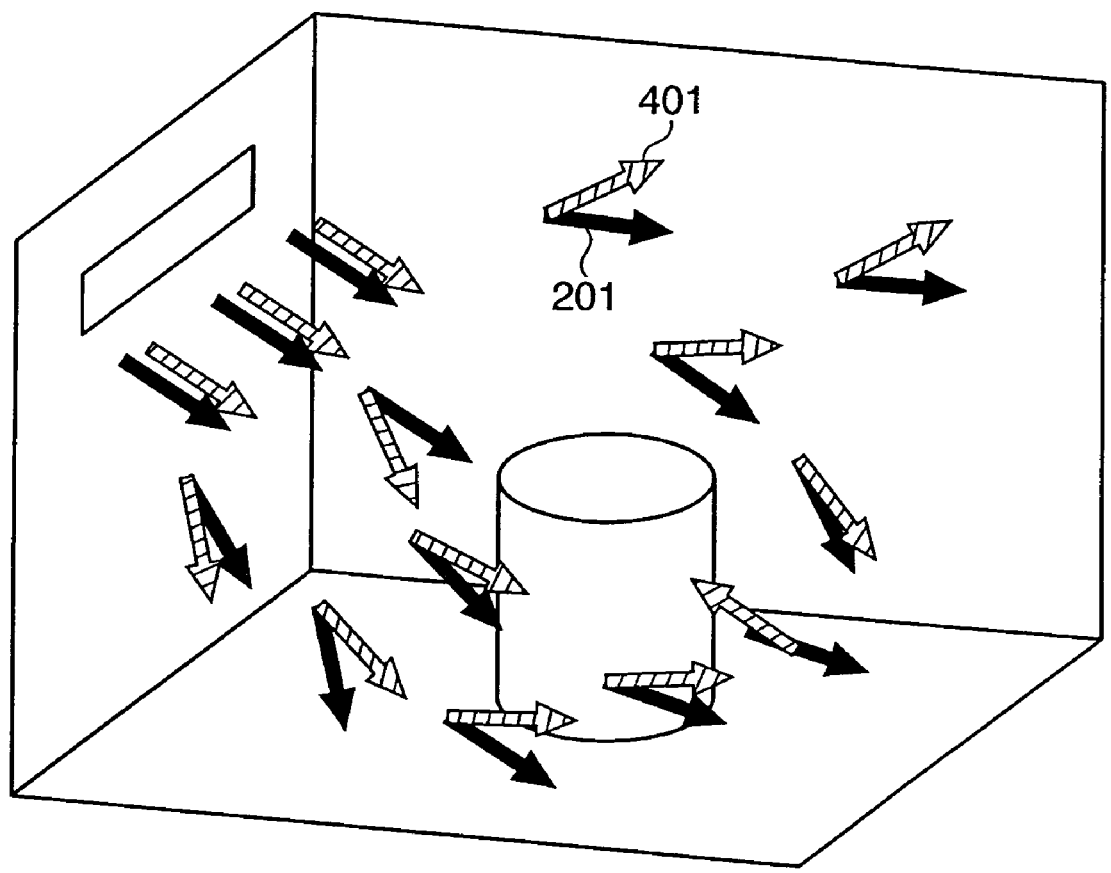
FIG. 4 shows an example of the virtual space shown in FIG. 2 on which second objects are further arranged in step S1006.
Figure 7:
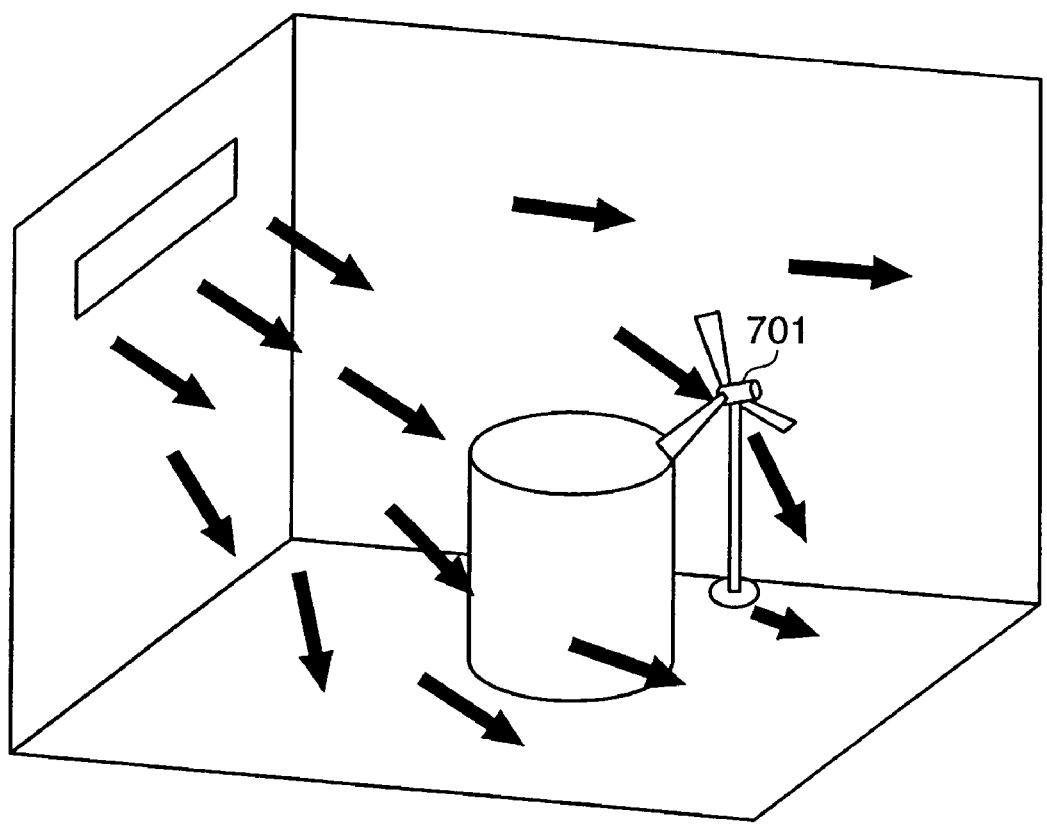
FIG. 7 shows an example of the second objects.

The CPU 901 arranges second objects which indicate the analytic values of the wind direction and air volume at the positions calculated in step S1003 of the analysis result in step S1004 at the positions on the virtual space corresponding to those calculated in step S1003 (step S1006). FIG. 4 shows an example of the virtual space shown in FIG. 2, on which the second objects are further arranged in step S1006. Referring to FIG. 4, reference numeral 401 denotes second objects, each of which represents the wind direction by the direction of an arrow, and the air volume by the length of the arrow. Each arrow represents the analytic values of the wind direction and air volume at the corresponding measurement positions obtained in step S1003. Note that the expression form of the second object is not limited to that shown in FIG. 4 as in the first object. For example, when each analytic value is expressed by a representational model like a windmill model 701, as shown in FIG. 7, the difference between the analytic value and actual measured value can be clearly presented to the user. FIG. 7 shows an example of the second objects.

Figure 5:
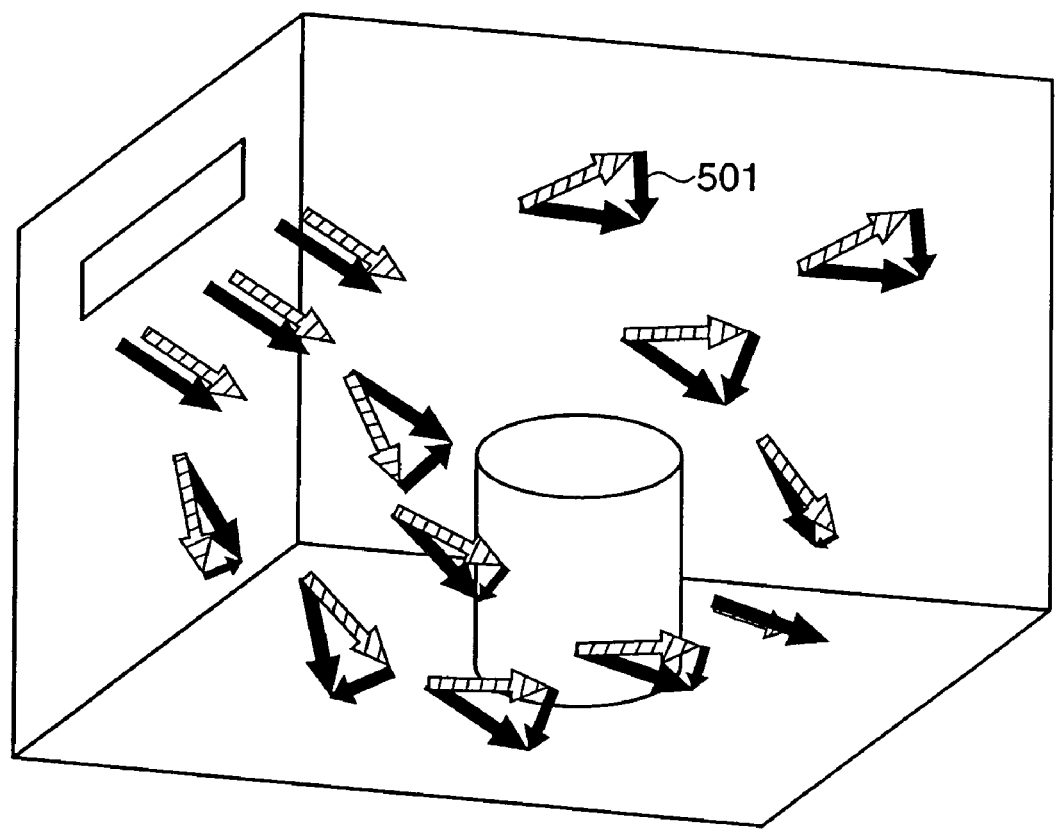
FIG. 5 shows an example of the virtual space shown in FIG. 4 on which third objects are further arranged in step S1007.
Figure 6:
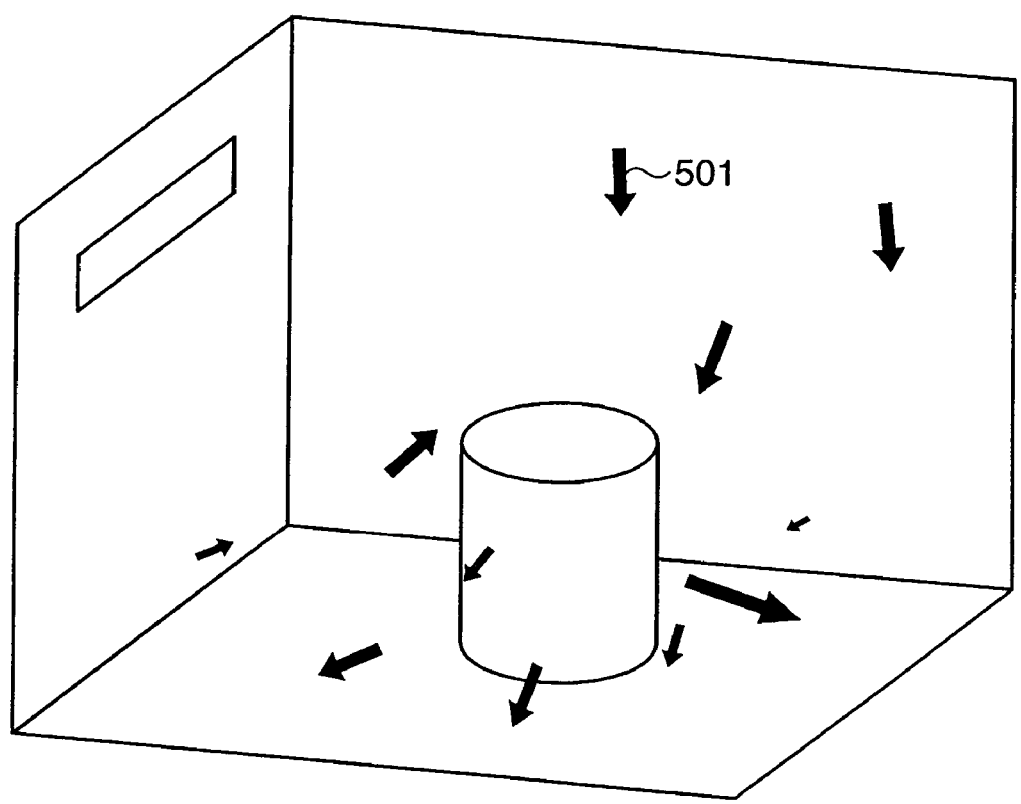
FIG. 6 shows an example of the virtual space on which the third objects alone are arranged.

The CPU 901 executes processing for arranging third objects, each of which represents a difference between the measured values represented by the corresponding first object and the analytic values represented by the corresponding second object (step S1007). That is, an arrow which directs from the tip position of the arrow as the first object toward the tip position of the arrow as the second object is arranged as the third object. FIG. 5 shows an example of the virtual space shown in FIG. 4 on which the third objects are further arranged in step S1007. As shown in FIG. 6, only the third objects may be arranged without arranging the first and second objects. Conversely, the first and second objects may be arranged, and arrangement of the third objects may be omitted. FIG. 6 shows an example of the virtual space on which only the third objects are arranged.

The CPU 901 generates an image which is seen upon observing the virtual space on which the first to third objects are arranged from a viewpoint having a predetermined position and orientation (step S1008). Since the processing for generating such virtual space image is known to those who are skilled in the art, a description thereof will be omitted.

The CPU 901 outputs the generated virtual space image to the display unit 805 (step S1009). As a result, the image which is seen upon observing the virtual space on which the first to third objects are arranged from the viewpoint having the predetermined position and orientation is displayed on the display screen of the display unit 805.

Note that the position and orientation of the viewpoint may use predetermined ones, or the user may input a change instruction using the operation unit 904 and the CPU 901 may change the position and orientation of the viewpoint in response to this instruction.

As described above, according to this embodiment, the user can visually recognize differences between the actual measured values and analytic values at respective positions on the physical space.

Note that this embodiment obtains the measured values, analytic values, and difference values of the airflow in the apparatus 101. The "interior of the apparatus 101" is an example of a space to be measured on the real space, and the present invention can be similarly applied to any other spaces to be measured.

This embodiment uses the vector fields of the wind direction and air volume as the physical quantities to be measured. However, the physical quantities of other kinds of vector fields may be measured, or the physical quantities of scalar fields such as temperature and the like may be measured.

[Second Embodiment]

Figure 18:
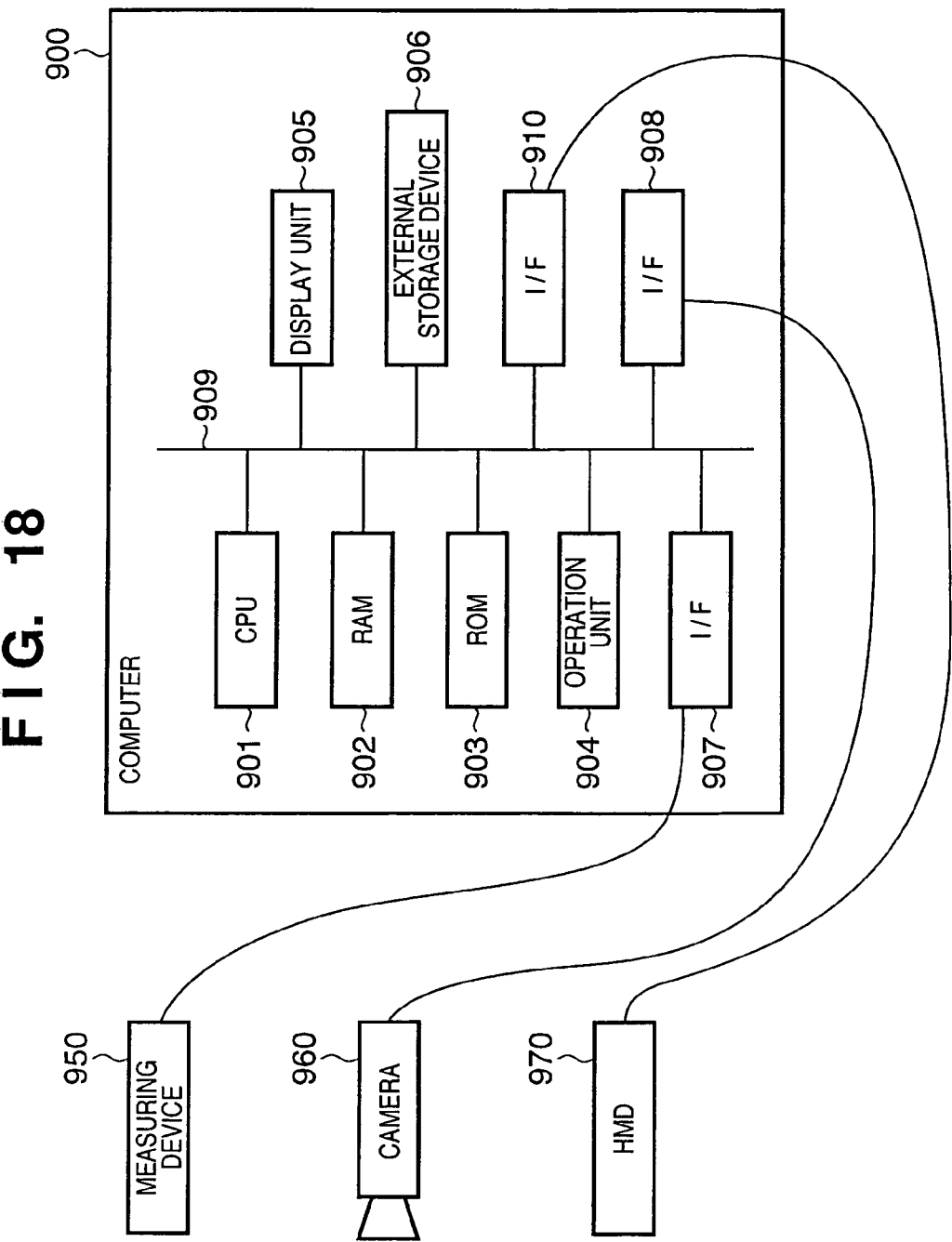
FIG. 18 is a block diagram showing the functional arrangement of a system according to the second embodiment of the present invention.

The first embodiment displays only on the display unit 805 the image of the virtual space on which the first to third objects are arranged. Alternatively, an HMD may be newly connected to the computer 900, and the image may be displayed on the display screen of this HMD. FIG. 18 is a block diagram showing the functional arrangement of a system according to this embodiment. An HMD 970 is connected to the arrangement shown in FIG. 9 via an I/F 910. The same reference numerals in FIG. 18 denote the same parts as in FIG. 9, and a description thereof will be omitted. A configuration which can measure the position and orientation of the HMD 970 is required (for example, a sensor for measuring the position and orientation of the HMD 970 itself may be attached). The measured position and orientation of the HMD 970 are output to the computer 900.

The computer 900 calculates the positions and orientations of two eyes of the user using the measured position and orientation, and a bias value (stored in advance in the external storage device 906) of the two eyes of the user who wears the HMD 970 on the head. Then, the computer 900 executes the processing described in the first embodiment to have the two eyes with the calculated positions and orientations as viewpoints. In this way, the computer 900 can present the image of the virtual space, on which the first to third objects are arranged and which is seen according to the positions and orientations of the two eyes of the user who wears the HMD 970 on the head, to the positions in front of the eyes of the user.

Furthermore, cameras for capturing images of the real space may be provided to the positions near the two eyes of the user, and the virtual space image may be combined on the real space images captured by the cameras. In this way, the image obtained by combining the virtual space on which the first to third objects are arranged and the real space seen from the viewpoints of the user who observes this virtual space can be presented to the positions in front of the eyes of the user.

For example, when a real apparatus 101 is prepared, and the first to third objects are displayed to be combined on it, the user can observe the measured values, analytic values, and difference values to be combined on the real apparatus 101. The present invention is not limited to the HMD but may be similarly applied to an HHD (Hand Held Display: a display device which can be held by the hand of the observer).

Figure 11:
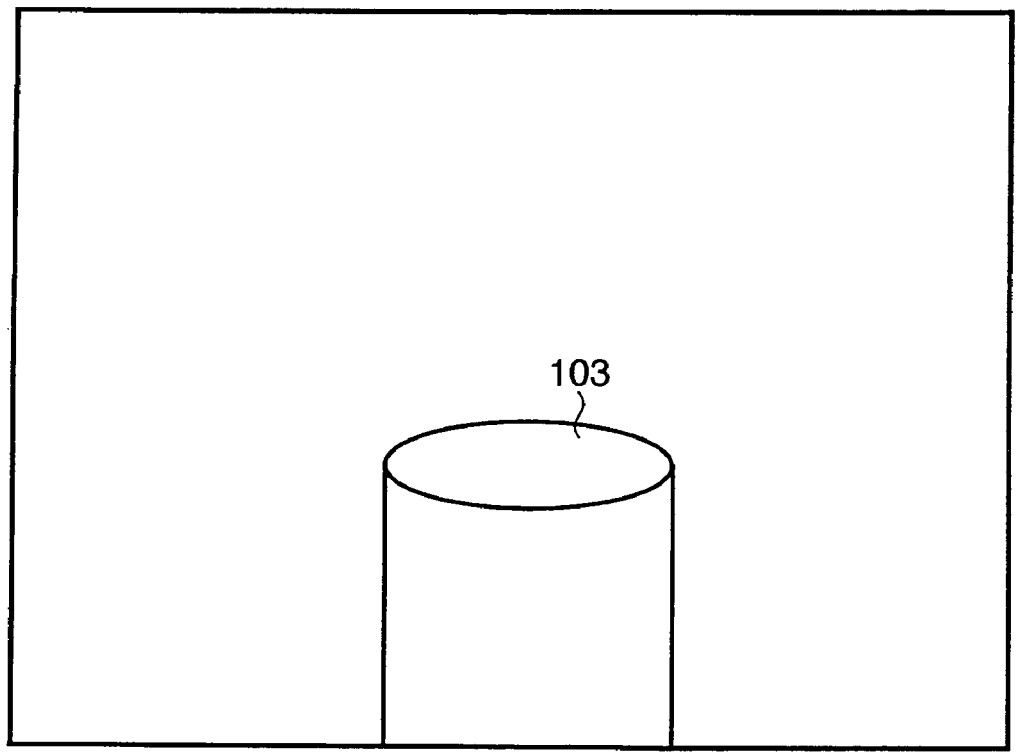
FIG. 11 shows a display example of an image displayed on the display screen of an HMD when the user who has moved in the apparatus 101 observes a component 103.

Furthermore, in this embodiment, the user actually wears the HMD 970 and observes the measured values and analytic values from inside of the apparatus 101. FIG. 11 shows a display example of an image displayed on the display screen of the HMD 970 when the user who moves into the apparatus 101 observes the component 103.

Figure 12:
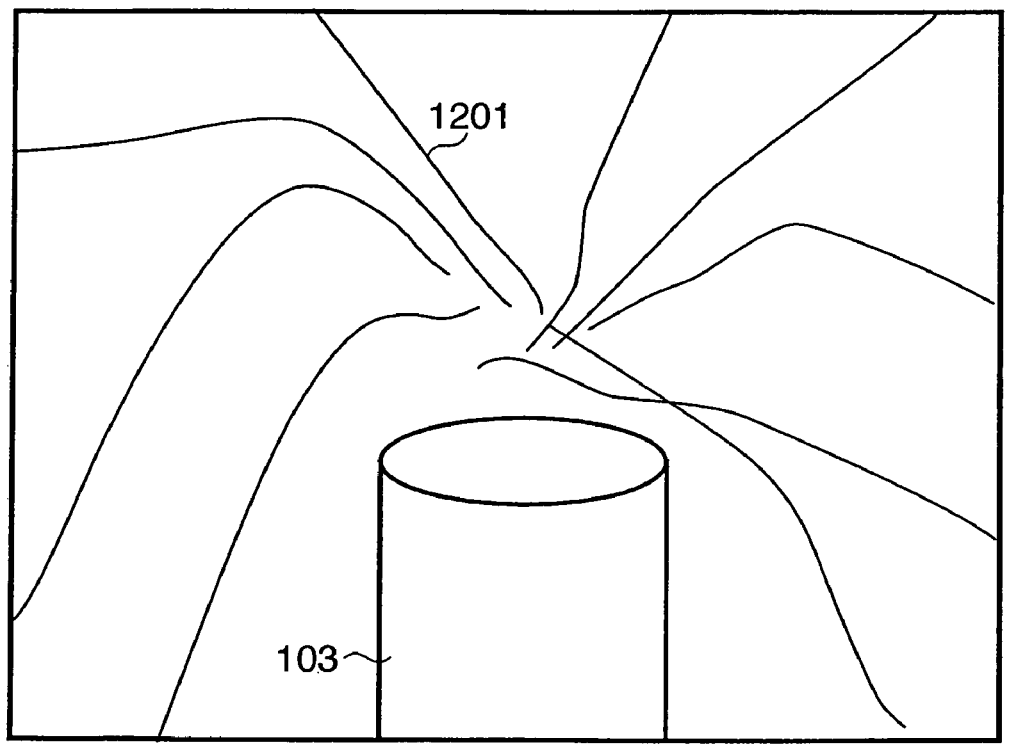
FIG. 12 shows a display example of an image displayed on the display screen of the HMD of the user in the apparatus 101 upon displaying the analytic values of the flow of air in the apparatus 101 as flow lines.

FIG. 12 shows a display example of an image displayed on the display screen of the HMD 970 of the user in the apparatus 101 upon displaying the analytic values of the flow of air in the apparatus 101 as flow lines. In FIG. 12, reference numeral 1201 denotes curves (objects) which represent the analytic values of the flow of air, displayed as flow lines.

Figure 13:
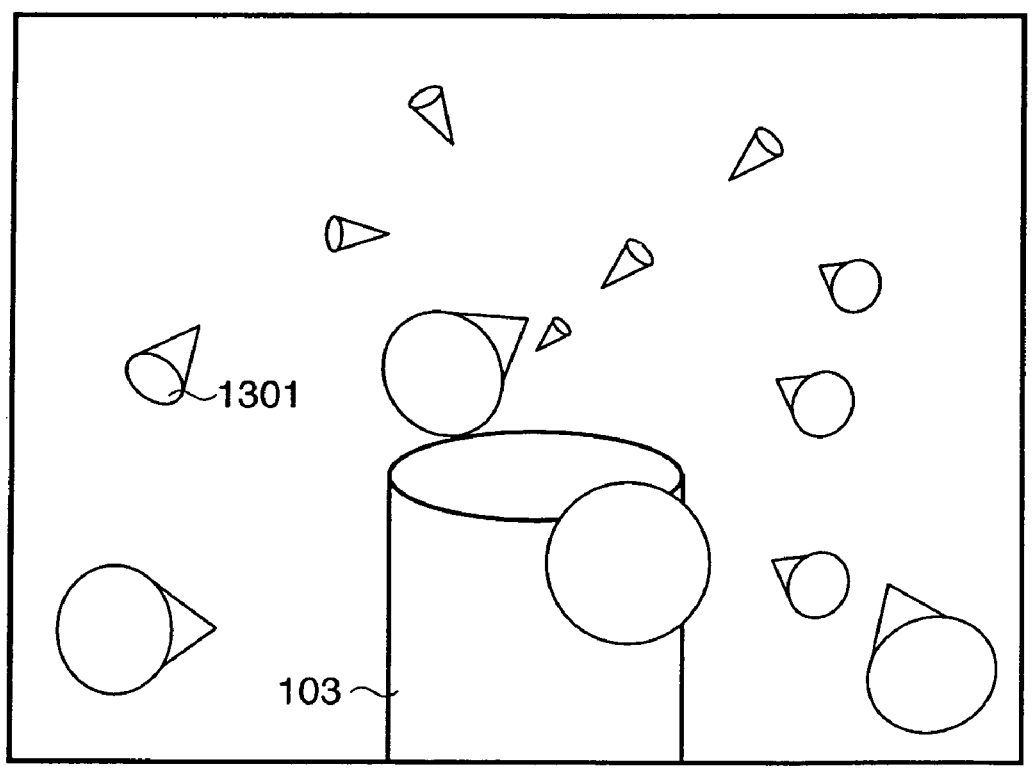
FIG. 13 shows a display example of an image displayed on the display screen of the HMD of the user in the apparatus 101 upon displaying the measured values of the flow of air in the apparatus 101 as arrows.

FIG. 13 shows a display example of an image displayed on the display screen of the HMD 970 of the user in the apparatus 101 upon displaying the measured values of the flow of air in the apparatus 101 as arrows. In FIG. 13, reference numeral 1301 denotes the measured values of the flow of air displayed as arrows, i.e., objects indicating the flow of air at respective points.

Figure 14:
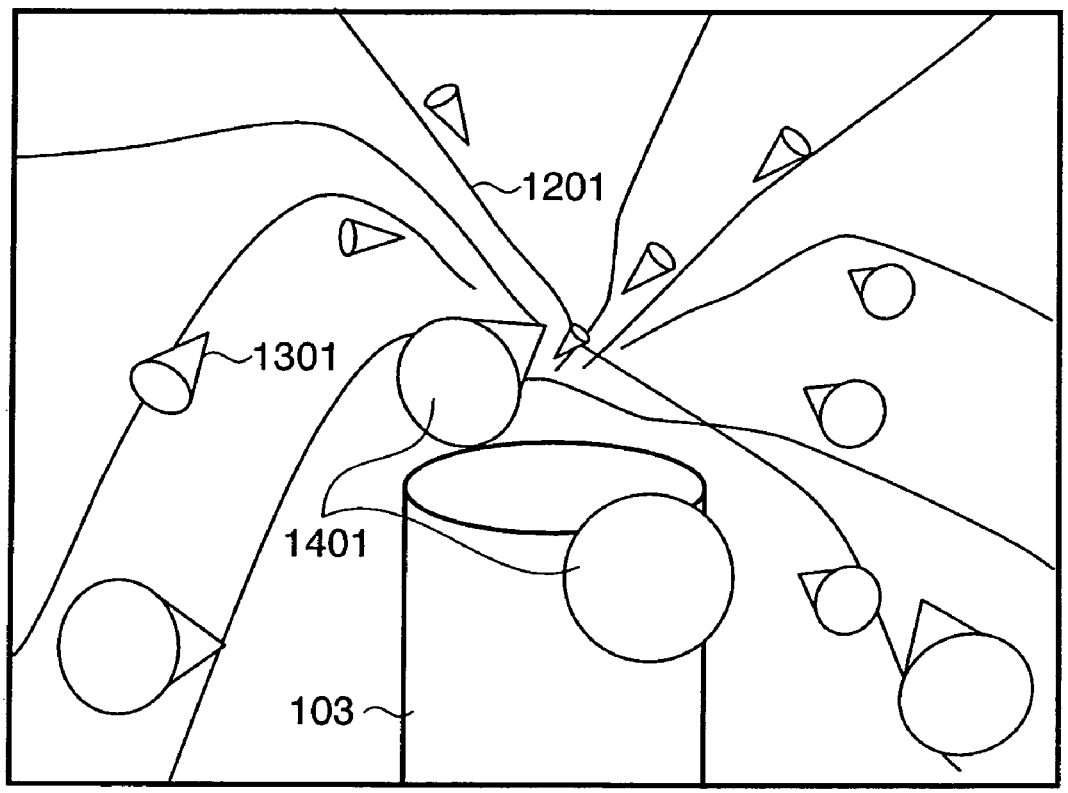
FIG. 14 shows a display example upon simultaneously displaying curves 1201 indicating the analytic values of the flow of air displayed as flow lines, and objects indicating the measured values of the flow of air displayed as arrows.

When values such as the measured values, analytic values, and the like, which exist everywhere on the space, are visualized and are presented to the user who is in that space like in this embodiment, an image which is very hard to be seen for the user may be generated. FIG. 14 shows a display example upon simultaneously displaying the curves 1201 that represent the analytic values of the air flow displayed as flow lines, and the objects 1301 that represent the measured values of the air flow displayed as arrows. That is, the image shown in FIG. 12 is combined with that shown in FIG. 13. As shown in FIG. 14, since objects 1401 which exist near the user (some of the objects 1301) are displayed in a relatively larger scale on the screen, they may occlude objects behind them, and these occluded objects cannot be seen.

Figure 15:
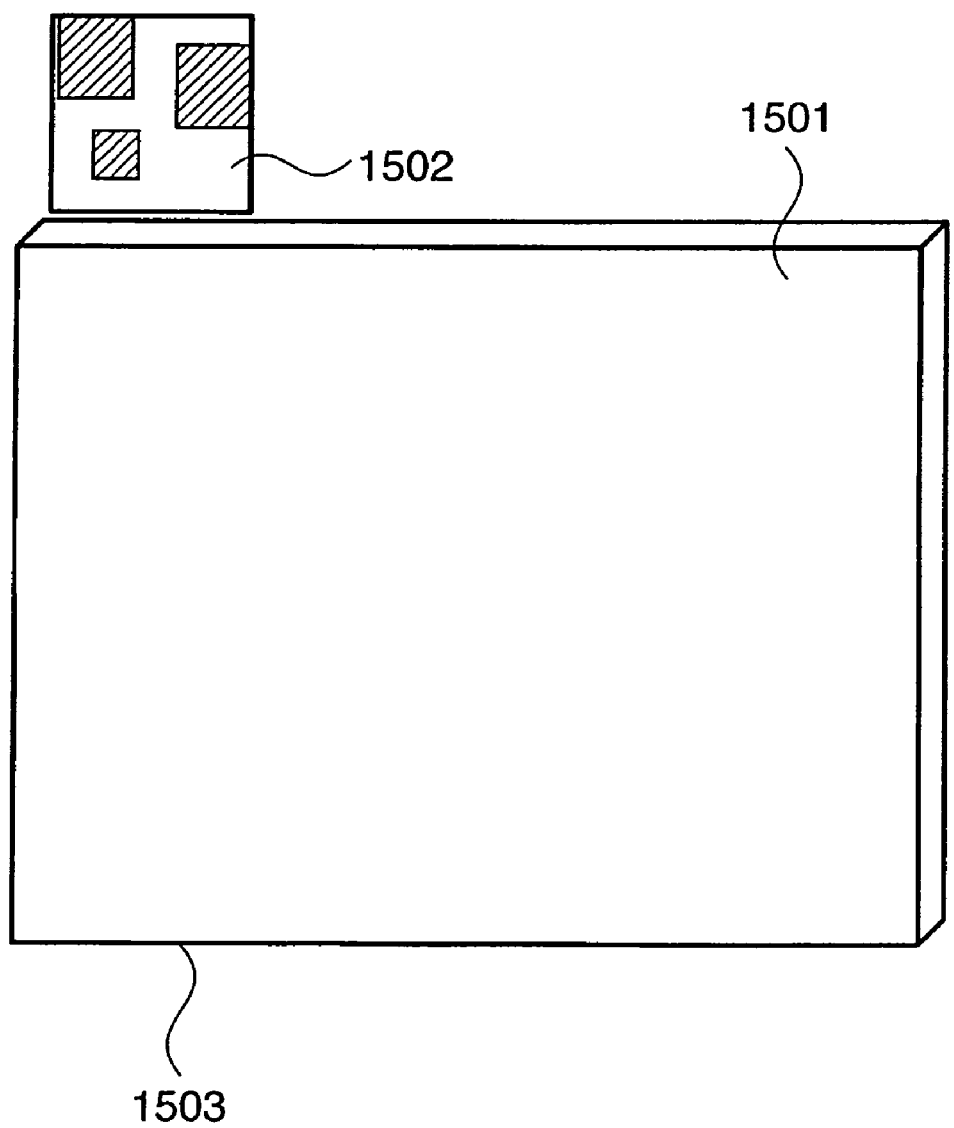
FIG. 15 shows a configuration example of a manipulation device 1503.

To solve this problem, this embodiment uses a manipulation device 1503 shown in FIG. 15. FIG. 15 shows a configuration example of the manipulation device 1503. The manipulation device 1503 is a device with a size as small as it can be held by the hand of the user, and is formed of a transparent acrylic plate 1501 and a marker 1502.

The marker 1502 is used to measure the self position. When cameras, which are attached to the positions near the two eyes of the user and are used to capture the real space, capture this marker, the position where this marker exists can be measured. The marker has a unique pattern. Upon capturing the image of this marker, a plurality of markers can be recognized as different ones. Such technique is known to those who are skilled in the art.

Figure 16:
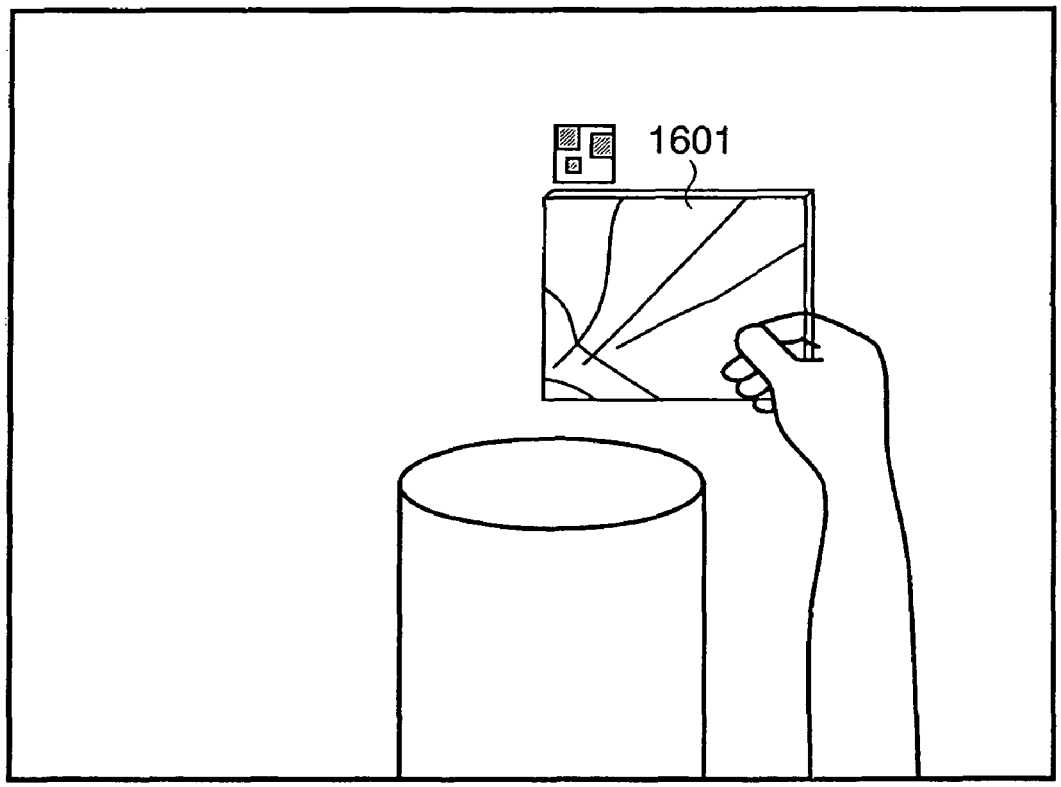
FIG. 16 shows a state wherein the user holds up the manipulation device 1503.

Assume that the user holds up the manipulation device 1503, as shown in FIG. 16. FIG. 16 shows a state wherein the user holds up the manipulation device 1503.

When the cameras, which are attached to the positions near the two eyes of the user and are used to capture the real space, capture this marker, the position of the marker 1502, and that of the acrylic plate 1501 can be obtained. Furthermore, since information of the size of the acrylic plate is recorded in advance in association with the marker, a portion 1601 occupied by the acrylic plate 1501 in the screen at that time can be calculated.

Then, this acrylic plate serves like a viewfinder, and the flow line display of the analytic values can be made only on the portion 1601 occupied by the acrylic plate 1501.

Figure 17:
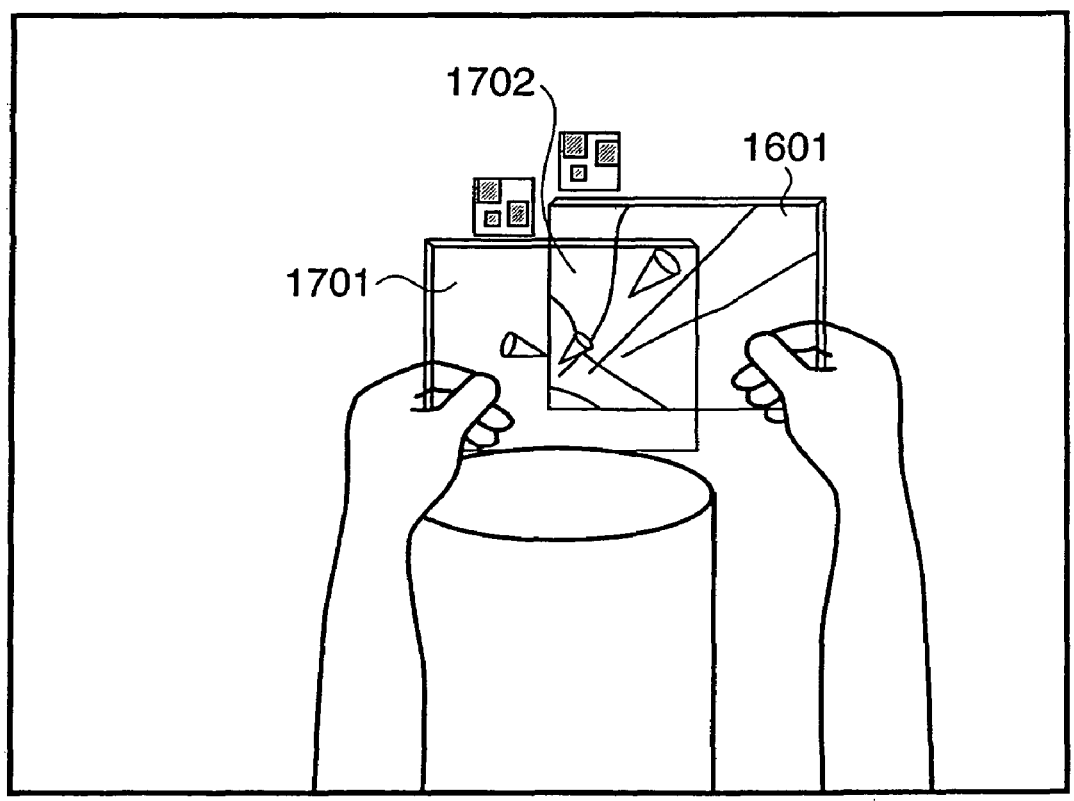
FIG. 17 shows a state wherein the user holds up a plurality of manipulation devices 1503.

In this embodiment, since the markers use different patterns, manipulation devices 1503 can have different functions. FIG. 17 shows a case wherein one manipulation device 1503 has a display function of the analytic values, the other manipulation device 1503 has a display function of the measured values, and these devices 1503 are used at the same time.

As shown in FIG. 17, the portion 1601 occupied by one acrylic plate 1501 displays objects representing the analytic values, and a portion 1701 occupied by the other acrylic plate 1501 displays objects representing the measured values. An overlapping region 1702 of the portions 1601 and 1701 displays both the measured values and analytic values. FIG. 17 shows a state wherein the user holds up the plurality of manipulation devices 1503.

As described above, the present invention is not limited to such specific means for designating a region for displaying objects representing the measured values, and that for displaying objects representing the analytic values, and various other methods may be used. For example, the rendering processing of objects may be performed in association with a virtual space which is seen via a predetermined plane region on the virtual space.

A window object is arranged on the virtual space, so that the position of a window is located at that of a position and orientation sensor held by the hand of the user, and the orientation of the position and orientation sensor agrees with the azimuth vector of this window. The vertical and horizontal sizes of the window may be determined in advance, or may be changed as needed using the operation unit 904. Then, the object rendering processing may be performed for a virtual space which is seen via this window.

Furthermore, the present invention is not limited to such specific method of designating a viewable region via the plane region so as to designate the region for displaying objects representing the measured values, and that for displaying objects representing the analytic values. For example, virtual rectangular solids with a predetermined size are arranged at the positions of position and orientation sensors which are respectively held by the right and left hands of the user, and the regions may be designated by these virtual rectangular solids irrespective of the viewpoints of the user.

[Third Embodiment]

The systems described in the first and second embodiments can also be applied to CAD-related systems, and entertainment apparatuses such as games, amusement equipment, and the like. Furthermore, these systems can also be used in simulation apparatuses for architecture, medical services, and the like, business applications such as an assistant of maintenance jobs and the like, broadcast-related applications such as weather forecast and the like, and so forth.

[Other Embodiments]

The objects of the present invention can be achieved as follows. That is, a recording medium (or storage medium), which records a program code of software that can implement the functions of the above-mentioned embodiments is supplied to a system or apparatus. A computer (or a CPU or MPU) of the system or apparatus reads out and executes the program code stored in the recording medium. In this case, the program code itself read out from the recording medium implements the functions of the above-mentioned embodiments, and the recording medium which records the program code constitutes the present invention.

When the computer executes the readout program code, an operating system (OS) or the like running on the computer performs some or all of actual processing operations based on an instruction of the program code. The present invention also includes a case wherein the functions of the above-mentioned embodiments are implemented by this processing.

Furthermore, assume that the program code read out from the recording medium is written in a memory of a function extension card or a function extension unit, which is inserted in or connected to the computer. After that, the functions of the above-mentioned embodiments are implemented by some or all of actual processing operations executed by a CPU or the like arranged in the function extension card or function extension unit based on an instruction of the program code. Such case is also included in the present invention.

When the present invention is applied to the recording medium, that recording medium stores program codes corresponding to the aforementioned flowchart.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Applications No. 2005-290373 filed Oct. 3, 2005 and No. 2006-207176 filed Jul. 28, 2006, which are hereby incorporated by reference herein in their entirety.

What is claimed is:

1. An information processing apparatus comprising:
   first acquisition unit constructed to acquire a measured value of a physical quantity indicating movement of a measurement target existing in a predetermined region on a real space, by measuring the physical quantity indicating the movement at a position of a measuring device using the measuring device;
   second acquisition unit constructed to acquire the position where the measuring device performs the measurement;
   calculation unit constructed to calculate a simulation value of the physical quantity indicating the movement of the measurement target at the position by executing simulation calculation processing of the physical quantity, by using calculation model formulas used for the simulation calculation processing of the physical quantity and using data prepared in advance for the predetermined region, wherein the simulation value is a predicted value and includes a difference from the measured value;
   first arrangement unit constructed to arrange a first vector type object, whose direction and length are defined by the measured value acquired by said first acquisition unit at a point corresponding to the position on a virtual space which has a coordinate system that matches a coordinate system of the real space;
   second arrangement unit constructed to arrange a second vector type object, whose direction and length are defined by the simulation value calculated by said calculation unit at the point;
   third arrangement unit constructed to arrange near the point a third vector type object representing the difference between the measured value represented by the first vector type object and the simulation value represented by the second vector type object, and which is for causing a user to visually recognize the difference between the measured value and the simulation value;
   generation unit constructed to generate an image which is seen upon viewing the virtual space on which the first, second, and third vector type objects are arranged from a viewpoint of the user; and
   output unit constructed to output the image generated by said generation unit.

2. The apparatus according to claim 1, further comprising:
   third acquisition unit constructed to acquire a position and orientation of a head mounted display which is worn on a head of an observer of the virtual space, and
   wherein said generation unit generates the image which is seen upon viewing the virtual space on which the first, second, and third vector type objects are arranged from a viewpoint having the position and orientation acquired by said third acquisition unit, and
   said output unit outputs the image to a display unit of the head mounted display.

3. The apparatus according to claim 1, wherein said generation unit comprises:
   first unit constructed to generate an image which is seen upon viewing a virtual space on which the first vector type object is arranged from the viewpoint via a first plane region arranged on the virtual space; and
   second unit constructed to generate an image which is seen upon viewing a virtual space on which the second vector type object is arranged from the viewpoint via a second plane region arranged on the virtual space, and
   said output unit outputs a result obtained by rendering the image generated by said first unit in the first plane region seen from the viewpoint, and rendering the image generated by said second unit in the second plane region seen from the viewpoint.

4. The apparatus according to claim 1, wherein said generation unit comprises:
   first unit constructed to generate an image which is seen upon viewing a virtual space on which the first vector type object is arranged from the viewpoint via a first rectangular solid arranged on the virtual space; and
   second unit constructed to generate an image which is seen upon viewing a virtual space on which the second vector type object is arranged from the viewpoint via a second rectangular solid arranged on the virtual space, and
   said output unit outputs a result obtained by rendering the image generated by said first unit in the first rectangular solid seen from the viewpoint, and rendering the image generated by said second unit in the second rectangular solid seen from the viewpoint.

5. An information processing method comprising:
   a first acquisition step of acquiring a measured value of a physical quantity indicating movement of a measurement target existing in a predetermined region on a real space, by measuring the physical quantity indicating the movement at a position of a measuring device using the measuring device;
   a second acquisition step of acquiring the position where the measuring device performs the measurement;
   a calculation step of calculating a simulation value of the physical quantity indicating the movement of the measurement target at the position by executing simulation calculation processing of the physical quantity, by using calculation model formulas used for the simulation calculation processing of the physical quantity and using data prepared in advance for the predetermined region, wherein the simulation value is a predicted value and includes a difference from the measured value;
   a first arrangement step of arranging a first vector type object, whose direction and length are defined by the measured value acquired in the first acquisition step at a point corresponding to the position on a virtual space which has a coordinate system that matches a coordinate system of the real space;
   a second arrangement step of arranging a second vector type object, whose direction and length are defined by the simulation value calculated in said calculation step at the point;
   a third arrangement step of arranging near the point a third vector type object representing the difference between the measured value represented by the first vector type object and the simulation value represented by the second vector type object, and which is for causing a user to visually recognize the difference between the measured value and the simulation value;
   a generation step of generating an image which is seen upon viewing the virtual space on which the first, second, and third vector type objects are arranged from a viewpoint of the user; and
   an output step of outputting the image generated in the generation step.

6. A non-transitory computer-readable storage medium retrievably storing a program for making a computer execute an information processing method according to claim 5.

* * * * *